US010605204B2

(12) United States Patent
Biblarz et al.

(10) Patent No.: US 10,605,204 B2
(45) Date of Patent: Mar. 31, 2020

(54) METHANE/OXYGEN ROCKET ENGINE WITH SPECIFIC IMPULSE ENHANCEMENT BY HOT HELIUM INFUSION

(71) Applicant: The Government of the United States of America, as represented by the Secretary of the Navy, Arlington, VA (US)

(72) Inventors: Oscar Biblarz, Carmel, CA (US); Garth V. Hobson, Pacific Grove, CA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 284 days.

(21) Appl. No.: 15/857,972

(22) Filed: Dec. 29, 2017

(65) Prior Publication Data
US 2020/0011275 A1   Jan. 9, 2020

Related U.S. Application Data

(60) Provisional application No. 62/469,377, filed on Mar. 9, 2017.

(51) Int. Cl.
*F02K 9/48* (2006.01)
*F02K 9/50* (2006.01)
(Continued)

(52) U.S. Cl.
CPC .............. *F02K 9/48* (2013.01); *F02K 9/42* (2013.01); *F02K 9/425* (2013.01); *F02K 9/44* (2013.01);
(Continued)

(58) Field of Classification Search
CPC ... F02K 9/42; F02K 9/425; F02K 9/44; F02K 9/48; F02K 9/50; F02K 9/64; F02K 9/972
See application file for complete search history.

(56) References Cited

U.S. PATENT DOCUMENTS 3,309,026 A * 3/1967 Loprete ................. F02K 9/972
239/265.11
4,771,600 A   9/1988 Limerick et al.
(Continued)

OTHER PUBLICATIONS

Sutton, G. P., and O. Biblarz, Rocket Propulsion Elements, 7th. Ed., 2001, John Wiley & Sons, Inc., pp. 1-751.
(Continued)

*Primary Examiner* — William H Rodriguez
*Assistant Examiner* — Kyle Robert Thomas
(74) *Attorney, Agent, or Firm* — Naval Postgraduate School; Lisa A. Norris

(57) ABSTRACT

An apparatus and method to enhance the performance of rockets engines which utilize liquid methane/oxygen propellants by injecting optimized amounts of pressurized hot helium gas into the combustion chamber with the propellants. In one embodiment, the pressurized helium gas is stored at low temperatures near those of the cryogenic propellants and is used for regenerative cooling of the combustion chamber and nozzle during rocket operation in order to raise the temperature of the helium gas before being injected into the combustion chamber.

14 Claims, 5 Drawing Sheets
(2 of 5 Drawing Sheet(s) Filed in Color)

(51) Int. Cl.
  *F02K 9/64* (2006.01)
  *F02K 9/42* (2006.01)
  *F02K 9/44* (2006.01)
  *F02K 9/97* (2006.01)
  *F02K 9/58* (2006.01)

(52) U.S. Cl.
  CPC .................. *F02K 9/50* (2013.01); *F02K 9/64* (2013.01); *F02K 9/972* (2013.01); *F02K 9/58* (2013.01)

(56) References Cited

U.S. PATENT DOCUMENTS

| | | | |
|---|---|---|---|
| 4,831,818 A | 5/1989 | Martin | |
| 8,572,948 B1 | 11/2013 | Pinera | |
| 2007/0163228 A1* | 7/2007 | Brown | F02K 9/42 60/210 |
| 2009/0013663 A1 | 1/2009 | Kim | |
| 2012/0060464 A1* | 3/2012 | Grote | F02K 9/64 60/206 |
| 2015/0027102 A1* | 1/2015 | Bahn | F02K 9/425 60/258 |

OTHER PUBLICATIONS

Humble, R. W., Henry, G. N., and Larson. W.J., "Space Propulsion Analysis and Design", Appendix C, McGraw-Hill Space Technology Series, New York (1995), pp. 715-726.

Sutton, G. P., and O. Biblarz, Rocket Propulsion Elements, 8th. Ed., 2017, John Wiley & Sons, Inc., pp. 1-768.

Sutton, G. P., and O. Biblarz, Rocket Propulsion Elements, 9th. Ed., 2017, John Wiley & Sons, Inc., pp. 99-105, 224-225.

\* cited by examiner

METHANE/OXYGEN ROCKET ENGINE WITH SPECIFIC IMPULSE ENHANCEMENT BY HOT HELIUM INFUSION

CROSS-REFERENCE TO RELATED APPLICATIONS

This application claims the benefit of U.S. Provisional Application No. 62/469,377, filed Mar. 9, 2017, which is hereby incorporated in its entirety by reference.

BACKGROUND OF THE INVENTION

1. Field of the Invention

The present invention relates generally to rocket engines, and more particularly to specific impulse enhancement together with propellant pumping without turbopumps in rocket engines.

2. Description of the Related Art

Liquid propellant rocket engines (LPREs) are an essential vehicle component for placing payloads into earth orbit. Currently, liquid methane/liquid oxygen LPREs are of interest because, besides being viewed as ecologically friendly propellants, they have more adequate tankage properties. However, this propellant combination currently has a lower performance than existing liquid hydrogen/liquid oxygen LRPEs.

Specific impulse is a function of the ratio of the engine's thrust to the propellant mass flow rate. A known technique for maximizing the specific impulse ($I_{sp}$) of an LPRE is to operate fuel rich because hydrocarbon fuels contain a lot of hydrogen. In the case of methane/oxygen combustion, this method shows a very modest increase in the specific impulse. While a separate hydrogen injection source may be used to lower the combustor's gas mixture's molecular mass, liquid hydrogen has several undesirable tanking properties—extremely low temperatures and densities—and, the hydrogen molecule ($H_2$) dissociates and chemically reacts in the hot combustion chamber environment. Hydrogen gas is also not suitable for propellant pumping.

SUMMARY OF THE INVENTION

In accordance with one embodiment, a rocket engine having specific impulse enhancement by hot helium infusion includes: a pressurized liquid methane propellant connected to at least a first injection port of a combustion chamber of the rocket engine; the first injection port configured to allow injection of the liquid methane propellant into the combustion chamber; a pressurized liquid oxygen propellant connected to at least a second injection port of the combustion chamber; the second injection port configured to allow injection of the liquid oxygen propellant into the combustion chamber; a pressurized helium gas connected to a heat exchanger system surrounding the combustion chamber and a nozzle of the rocket engine; the heat exchanger system connected to a helium infusion control valve, the heat exchanger system configured to heat the helium gas; the helium infusion control valve connected to at least a third injection port of the combustion chamber, the helium infusion control valve configured to control the flow of the heated helium gas to the third injection port; and, the third injection port configured to allow injection of the heated helium gas into the combustion chamber; wherein, during operation of the rocket engine, the liquid methane propellant and the liquid oxygen propellants are injected into the combustion chamber, and the helium gas is heated in the heat exchanger system prior to injection into the combustion chamber such that upon injection of the heated helium gas into the combustion chamber where the liquid methane propellant and the liquid oxygen propellant are burning, the specific impulse of the rocket engine's exhaust gases is enhanced. In a further embodiment, the pressurized helium gas is further connected to a liquid methane storage tank containing the liquid methane propellant and to a liquid oxygen storage tank containing the liquid oxygen propellant, and the helium gas is used as the sole pressurizing agent for the liquid methane propellant and liquid oxygen propellant.

In accordance with another embodiment, a method for specific impulse enhancement by hot helium infusion of a rocket engine having a high pressure helium gas stored in a helium storage tank, a liquid methane propellant stored in a liquid methane storage tank, and a liquid oxygen propellant stored in a liquid oxygen storage tank, includes: opening a helium control valve to allow the high pressure helium gas to pressurize and pump the liquid methane propellant from the liquid methane storage tank and the liquid oxygen propellant from the liquid oxygen storage tank to a combustion chamber of the rocket engine, and to allow the high pressure helium gas to flow to a separate closed specific impulse control valve; activating one or more rocket control systems that control thrust of the rocket engine; controlling the injection of the liquid methane propellant through at least a first injection port into the combustion chamber; controlling the injection of the liquid oxygen propellant through at least a second injection port into the combustion chamber; igniting the injected liquid methane propellant and the liquid oxygen propellant in the combustion chamber; upon a determination that combustion has started in the combustion chamber and is self-sustaining, opening the specific impulse control valve and regulating the flow of the high pressure helium gas into one or more cooling conduits of a heat exchanger system surrounding the combustion chamber and a nozzle of the rocket engine to heat the helium gas; controlling the flow of the hot helium gas from the heat exchanger system to at least a third injection port to the combustion chamber by a helium infusion control valve; injecting the hot helium gas through the third injection port into the combustion chamber with the injected liquid methane propellant and the injected liquid oxygen propellant; and regulating the flow of the hot helium gas into the combustion chamber until a desired diluent mass ratio is achieved to enhance the specific impulse of the rocket engine Embodiments in accordance with the invention are best understood by reference to the following detailed description when read in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Herein the figures are not drawn to scale, but are set forth to illustrate various embodiments of the invention.

Embodiments in accordance with the invention are further described herein with reference to the drawings.

DETAILED DESCRIPTION OF THE INVENTION

Helium (He) has the lowest molecular mass after hydrogen. Compared to hydrogen, helium is inert and its compressed gas has well-known tanking/mass properties and is also a good regenerative coolant for the nozzle and combustion chamber of a rocket engine. Helium does not dissolve in propellant liquids such as oxygen or hydrocarbons and has been used to pump both fuel and oxidizer from their tanks in small rocket engines. Helium is viewed as non-toxic and does not dissociate at any temperature thereby avoiding the combustion-enthalpy decreases that hydrogen and other molecular species introduce at high chamber temperatures. While helium has been routinely used as the sole propellant in Vernier rocket engines for auxiliary propulsion and while compressed helium tanks are used for propellant pumping in relatively small rockets such as the Space Shuttle's Orbital Maneuvering System (OMS), helium has not been used inside medium to large size second or third stage rocket engines for propellant pumping in any engine toward increases for payload-capability enhancements.

Embodiments in accordance with the invention enhance the performance of rocket engines which utilize liquid methane ($CH_4$)/liquid oxygen ($O_2$) propellants, such as second-stage launch rockets, by adding hot helium gas as a diluent to the propellants to achieve potentially high specific-impulse ($I_{sp}$) enhancement capabilities. Before being injected into the combustion chamber with the propellants, the helium gas is passed through a regenerative cooling system of the rocket nozzle in order to raise the storage temperature of the helium gas. This translates into low gas weights when added as a diluent and potentially high specific-impulse ($I_{sp}$) enhancement. The $I_{sp}$ depends on $T_1/M$, where $T_1$ is the gas temperature at the entrance to the rocket nozzle and M is the molecular mass of the flow. In small thruster embodiments, utilization of helium gas injection circumvents the need for any turbopumps. At current prices, increases in vehicle payload capability of the rocket stage enhanced in accordance with the invention and hardware simplifications, together with a greater reliability, is projected to more than offset any costs and hardware of the added helium gas due to the larger rocket unit's ability to store a greater amount of helium gas.

Figure 1:
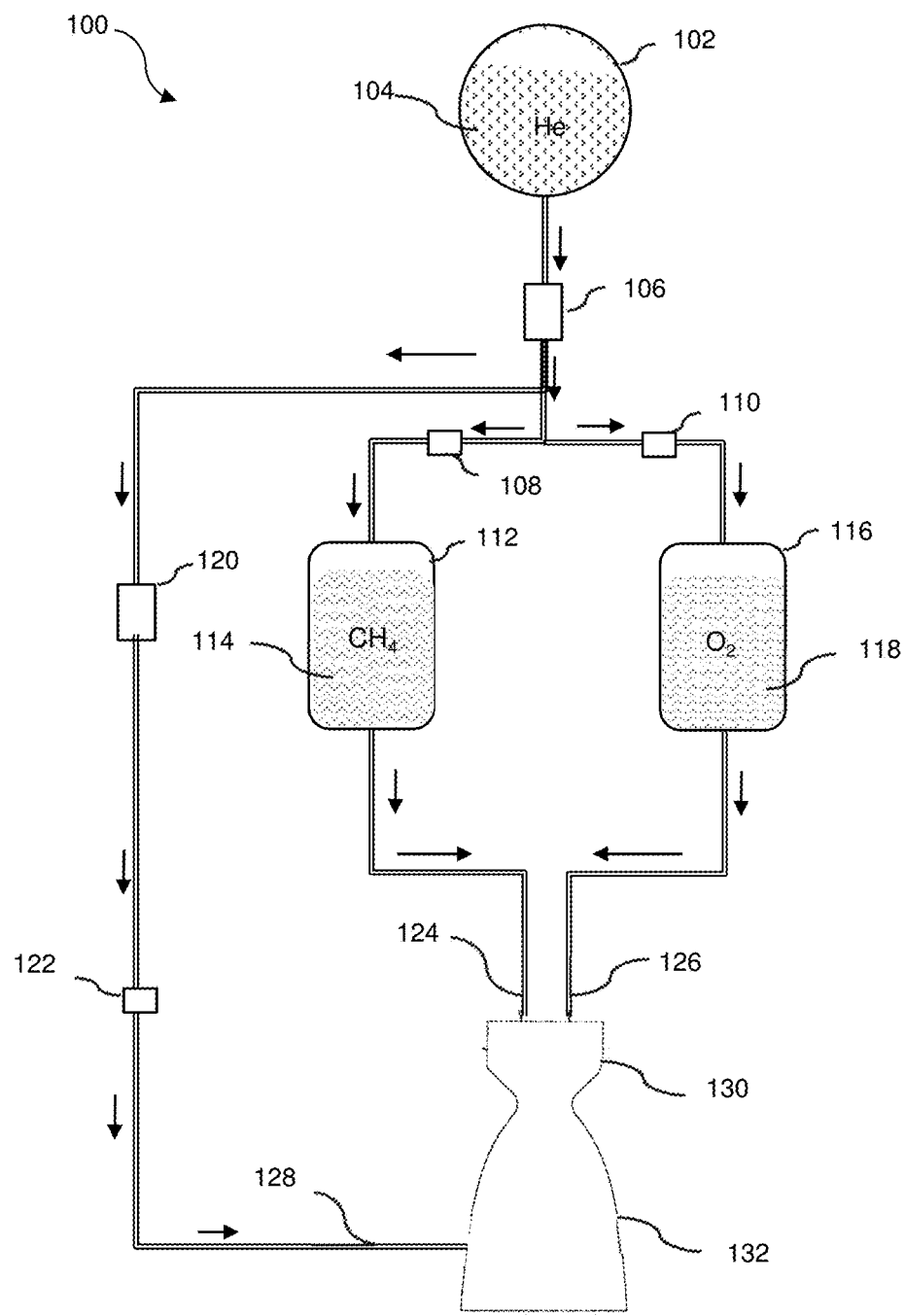
FIG. 1 is a schematic view of a liquid methane/liquid oxygen rocket engine with specific impulse enhancement by hot helium infusion in accordance with one embodiment of the invention.

Referring initially to FIG. 1, in one embodiment, a liquid $CH_4$/liquid $O_2$ rocket engine 100 with specific impulse enhancement by hot helium infusion includes a high pressure helium gas storage tank 102 which stores a helium gas 104 at high pressure and low temperature. High pressure helium gas 104 is routed from helium gas storage tank 102 via a helium control valve 106 through feed lines to each of a liquid methane storage tank 112 containing a liquid methane propellant 114 and to a liquid oxygen storage tank 116 containing a liquid oxygen propellant 118 for use in pressurizing tanks 112/116. High pressure helium gas 104 is also routed via helium control valve 106 through a feed line to a specific impulse control valve 120 which controls the introduction of helium gas 104 to a helium injection and pressure relief valve 122 for use in specific impulse enhancement of rocket engine 100 following pressurization of tanks 112/116. In one embodiment, a control valve 108 controls the flow of helium gas 104 to liquid methane storage tank 112, and a control valve 110 controls the flow of helium gas 104 to liquid oxygen storage tank 116. In one embodiment, liquid methane propellant 114 and liquid oxygen propellant 118 are cryogenically stored. To manage the heat transfer during storage and pumping, it is advantageous to store helium gas 104 at or near 100K, between the boiling points of oxygen (90K) and methane (112K). This should also aid with the rocket vehicle's tank arrangements (concentric or other nesting).

Liquid methane propellant 114 and liquid oxygen propellant 118 are respectively routed from liquid methane storage tank 112 and liquid oxygen storage tank 116 via respective feed lines 124 and 126 into one or more injectors feeding a combustion chamber 130 with production of resultant thrust from rocket engine 100 exiting a communicating nozzle 132.

For rocket engines below about 222 kN thrust operating for only a few minutes, helium gas 104 can be used in the total or partial pumping of both propellants, i.e., liquid methane propellant 114 and liquid oxygen propellant 118, depending on the overall injection mass flow rates, as, typically, more robust helium storage would be available. This arrangement is simpler overall, faster and more reliable than a LPRE working with turbopumps. Further, as helium is also routinely used for purging lines after propellant use, and stored as a gas, there can be no propellant sloshing issues.

In one embodiment, initially, specific impulse control valve 120 is closed to prevent the flow of helium gas 104 to helium injection and pressure relief valve 122 until liquid methane storage tank 112 and liquid oxygen storage tank 116 are pressurized to a specified pressure to allow sufficient flow and injection of the propellants 114, 118 into combustion chamber 130. When liquid methane storage tank 112 and liquid oxygen storage tank 116 are fully pressurized, specific impulse control valve 120 is opened to allow helium gas 104 to flow via the feed line to helium injection and pressure relief valve 122. Helium injection and pressure relief valve 122 then controls the flow of helium gas 104 into feed line 128 from where helium gas 104 is heated and utilized for specific impulse enhancement of rocket engine 100 as further described with reference to FIG. 2. It can be understood by those of skill in the art that fewer, more or different control valves and flow line configurations, together with additional switches, regulators, transducers, and filters, can be utilized to control the flow of helium gas 104, liquid methane 114, and liquid oxygen 118 dependent on the specific control systems (not shown) implemented in rocket engine 100.

Figure 2:
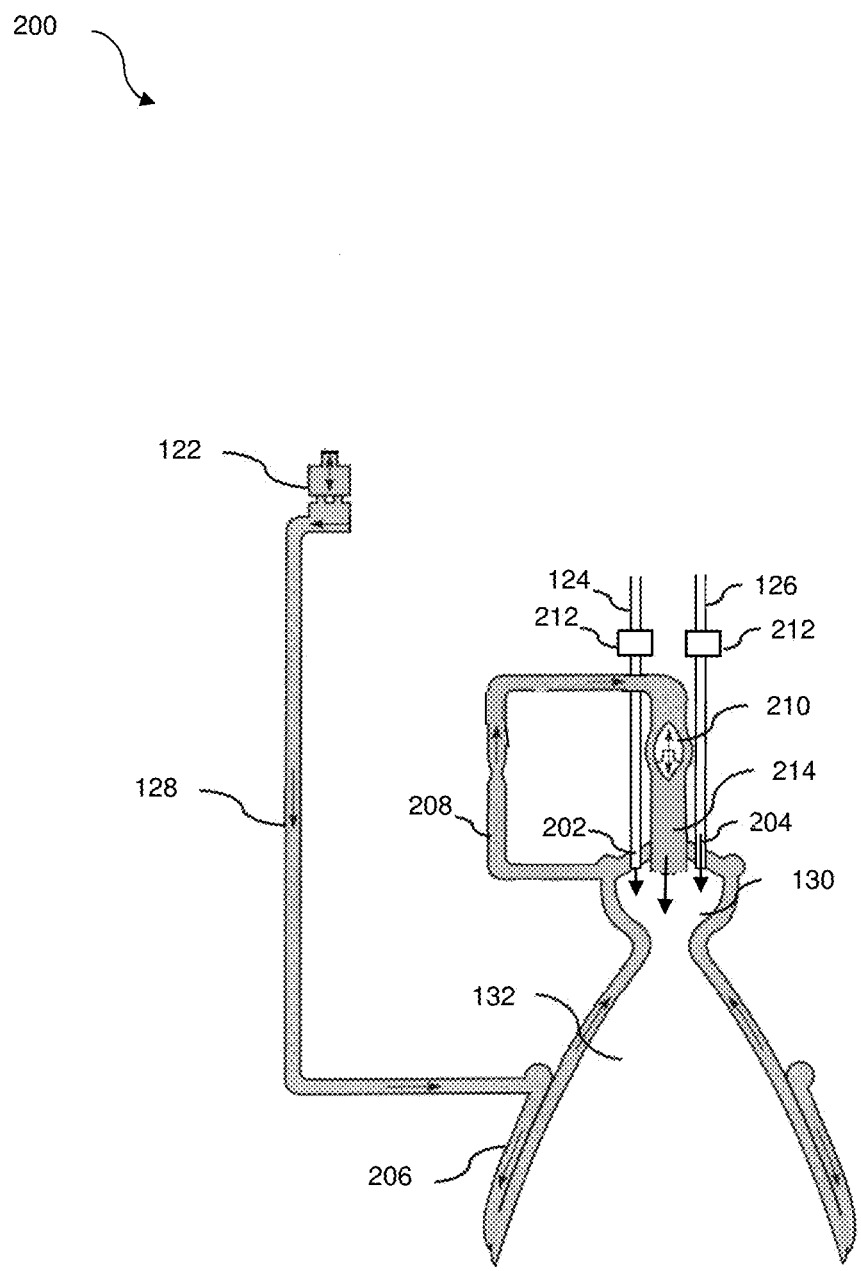
FIG. 2 is a schematic cross sectional view illustrating helium-injection-loop details for specific impulse enhancement of the rocket engine of FIG. 1 in accordance with one embodiment of the invention.

FIG. 2 illustrates specific impulse enhancement of rocket engine 100 in accordance with one embodiment of the invention. As earlier described, after pressurization by helium gas 104, liquid methane propellant 114 and liquid oxygen propellant 118 flow via respective feedlines 124, 126 to one or more injection ports 202 (a first injection port), 204

(a second injection port) where propellants 114, 118 are injected into combustion chamber 130. In some embodiments, one or more propellant control valves 212 can be utilized allow control and shutoff of the injection of liquid methane propellant 114 and liquid oxygen propellant 118 into combustion chamber 130.

Helium gas 104 input from helium injection and pressure relief valve 122 flows via feed line 128 into a heat exchanger system 206 surrounding combustion chamber 130 and nozzle 132. As helium gas 104 passes through the cooling conduits of heat exchanger system 206, the chamber walls of combustion chamber 130 and nozzle 132 are regeneratively cooled and helium gas 104 is heated. Dependent on the injection rates of helium gas 104, which can vary with application, other cooling mechanisms may also utilized separately or in conjunction with heat exchanger system 206. For example, in some embodiments, other cooling mechanisms may utilize one or more of the propellants as regenerative coolants separately or in conjunction with heat exchanger system 206 dependent on the rocket engine size and overall engine cooling needs. The now hot helium gas 104 leaves heat exchanger system 206 and flows into a feed line 208 where the injection of hot helium gas 104 into combustion chamber 130 through an injection port 214 (a third injection port) is controlled by a helium infusion control valve 210 based on inputs from a helium infusion control system (not shown) in communication with helium infusion control valve 210, and which may be part of the control systems to rocket engine 100. When injected into combustion chamber 130, hot helium gas 104 mixes with the burning liquid methane propellant 114 and liquid oxygen propellant 118 in combustion chamber 130 with a resultant increase in the specific impulse of rocket engine 100. In one embodiment, injections ports 202, 204, 214 are configured such that hot helium gas 104 is injected at the back plate of combustion chamber 130, where liquid methane propellant 114 and liquid oxygen propellant 118 are introduced, at or near the centerline of combustion chamber 130 for good mixing. The flows of helium gas 104, liquid methane propellant 114 and liquid oxygen propellant 118 and thrust levels are then allowed to increase under control of the control systems to rocket engine 100 until they reach full-rated values of combustion chamber pressure and thrust. In some embodiments, the control systems to rocket engine 100 may be used to prevent exceeding limits of the propellant mixture ratio or rates of increase during transient or exceeding material temperatures.

Figure 3:
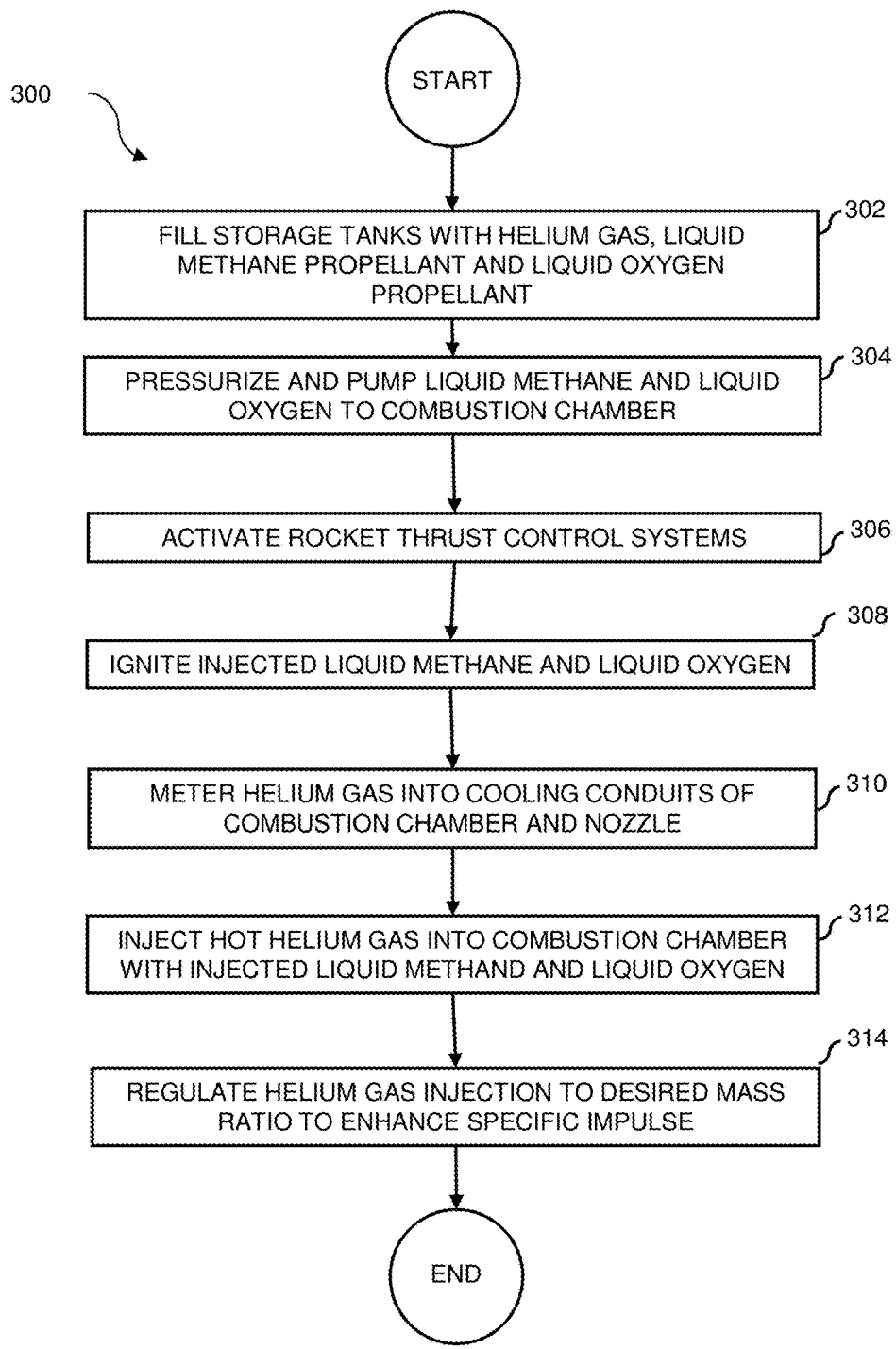
FIG. 3 illustrates a method for specific impulse enhancement of a liquid methane/liquid oxygen rocket engine by hot helium infusion and pumped by the high pressure helium in accordance with one embodiment of the invention.

FIG. 3 illustrates a method 300 for specific impulse enhancement of rocket engine 100 by hot helium infusion in accordance with one embodiment of the invention. The starting and stopping of a rocket engine requires various critical timings and valve sequencing to accommodate transient characteristics and are typically controlled by the control system(s) to the rocket engine. Pressure-fed propellant systems have smaller start-delay times and are lighter and more reliable than turbopumps. Prior to start of method 300, a pressurization system of rocket engine 100 has to be activated and any ullage volume in helium gas storage tank 102, liquid methane storage tank 112 and liquid oxygen storage tank 116 pressurized. With cryogenic propellants, such liquid methane propellant 114 and liquid oxygen propellant 118, the piping system, i.e., the feed lines, needs to be cooled to cryogenic temperatures to prevent vapor pockets. Purging the flow system is needed before the fuel flow control valves are opened and combustion initiated. For pressurized feed systems, the initial flow of each propellant is often considerably higher than the rated flow at full thrust because the pressure differential ($p_{tank}-p_{chamber}$) is much higher, with the combustion chamber pressure initially being at its lowest value; these higher flows may lead to an initial surge of combustion chamber pressure. To avoid any mishaps caused by propellant accumulation in the combustion chamber the rocket engine must be designed to slowly open the main propellant control valves or to build a throttling mechanism into them.

Referring now to FIG. 3 and method 300, initially, in operation 302, helium storage tank 102 is filled with high pressure helium gas 104, liquid methane storage tank 112 is filled with liquid methane propellant 114, and liquid oxygen storage tank 116 is filled with liquid oxygen propellant 118.

In operation 304, helium control valve 106 is opened and high-pressure helium gas 104 is fed into liquid methane storage tank 112 and liquid oxygen storage tank 116 for tank pressurization, and the flow of liquid methane propellant 114 and liquid oxygen propellant 118 for injection to combustion chamber 130 is initiated. Additionally, high pressure helium gas 104 flows to specific impulse control valve 120 which is initially closed.

In operation 306, the various control systems to rocket engine 100 which control thrust, such as control systems that control propellant mixture ratio and other parameters, are activated.

In operation 308, injection of liquid methane propellant 114 and liquid oxygen propellant 118 to combustion chamber 130 through injection ports 202, 204 are regulated based on thrust control system inputs to rocket engine 100 and are ignited in combustion chamber 130 with a suitable igniter.

In operation 310, after a sufficient temperature increase is sensed in combustion chamber 130 by control system sensors to rocket engine 100, specific impulse control valve 120 is opened and helium gas 104 flows to helium injection and pressure relief valve 122 which meters flow of helium gas 104 via feed line 128 into the cooling conduits of heat exchanger system 206. The flow of helium gas 104 into the cooling conduits surrounding combustion chamber 130 and nozzle 132 should be opened only shortly after control system sensors to rocket engine 100 indicate that combustion has started and is self-sustaining. The flow of helium gas 104 needs to be sequenced to provide the required coolant flow to the cooling conduits in both combustion chamber 130 and nozzle 132 after propellant ignition and throughout main stages of operation.

In operation 312, hot helium gas 104 from heat exchanger system 206 flows into feed line 208 for injection into combustion chamber 130 through injection port 214 as regulated by helium infusion control valve 210. In combustion chamber 130, injected hot helium gas 104 is mixed with liquid methane propellant 114 and liquid oxygen propellant 118. Hot helium gas 104 can be injected into combustion chamber 130 using either a single jet or a showerhead arrangement dependent on the dimension of combustion chamber 130 and the mass fraction flow rates of helium gas 104. With controlled introduction of hot helium gas 104 by helium infusion control valve 210, a relatively small flow rate of hot helium gas 104 is not expected to induce combustion instabilities or negatively affect the ongoing chemical process.

In operation 314, the flow of hot helium gas 104 is regulated and brought up to a desired mass ratio to enhance the specific impulse of rocket engine 100. As earlier described, the flows of helium gas 104, liquid methane propellant 114 and liquid oxygen propellant 118 and thrust levels are then allowed to increase until they reach full-rated values of combustion chamber pressure and thrust.

Figure 4:
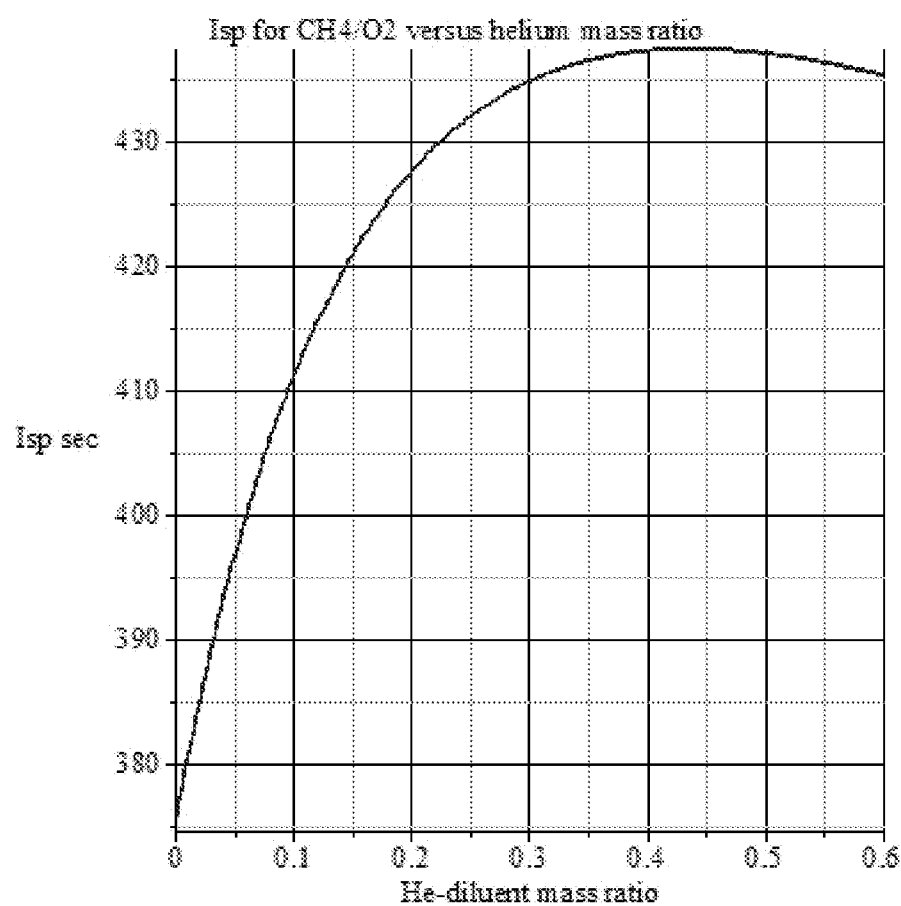
FIG. 4 illustrates a graph of specific impulse ($I_{sp}$) in sec of an $O_2/CH_4$ combusted mixture versus helium mass ratio x defined in 0030.

Embodiments in accordance with the invention can be utilized in various upper stages of launch rocket engines where the use of cryogenically stored $CH_4/O_2$ is deemed advantageous over $H_2/O_2$ because of tanking and other advantages such as reduced storage volume. Unlike hydrogen, there are no dissociations or chemical reactions with helium. As further discussed with reference to FIG. 4, varying degrees of specific impulse enhancement can be achieved utilizing helium injection with $CH_4/O_2$ propellants. FIG. 4 illustrates a graph of specific impulse ($I_{sp}$) in sec of an $O_2/CH_4$ mixture versus helium diluent mass ratio (x) with an $O_2/CH_4$ mixture ratio r=3.6 (stoichiometric=4.0), $T_1$=3500 K, $p_1$=4.36 MPa (combustor pressure), $\epsilon$=385 (nozzle area ratio), vacuum exhaust, liquid storage of $CH_4/O_2$ propellants, and shifting equilibrium flow (using NASA's CEA code). The mass ratio of helium diluent (x) is calculated as $$x \equiv \frac{\dot{m}_{He}}{\dot{m}_p} = \frac{m_{He}}{m_p} = \frac{n_{He} M_{He}}{n_p M_p}$$

where x is the mass ratio, the subscript "p" represents reaction products, m represents mass, and n represents the number of mols, and M represents the flow's molecular mass.

After cooling the combustor (i.e., combustion chamber)/nozzle, helium is injected at 1000 K at the combustor entrance. While the mixing of the helium gas does cool the combustion gases while decreasing the molecular mass of the exhaust mixture (because helium gas can only be injected at the maximum operating temperature of the hardware, e.g., at the nozzle throat, usually 1000 K for steels), as seen in FIG. 4, there is an attractive region of specific impulse enhancement during which the flow mixture temperature divided to molecular mass value remains advantageous. The maximum specific impulse ($I_{sp}$) in sec increase occurs at a helium mass ratio of 0.45 which represents a rather substantial helium mass flow. While a potential 12% increase of payload ratio is theoretically possible, such increases would not be desirable or cost effective beyond x=0.20 (the mass ratio of helium to total propellant).

Figure 5:
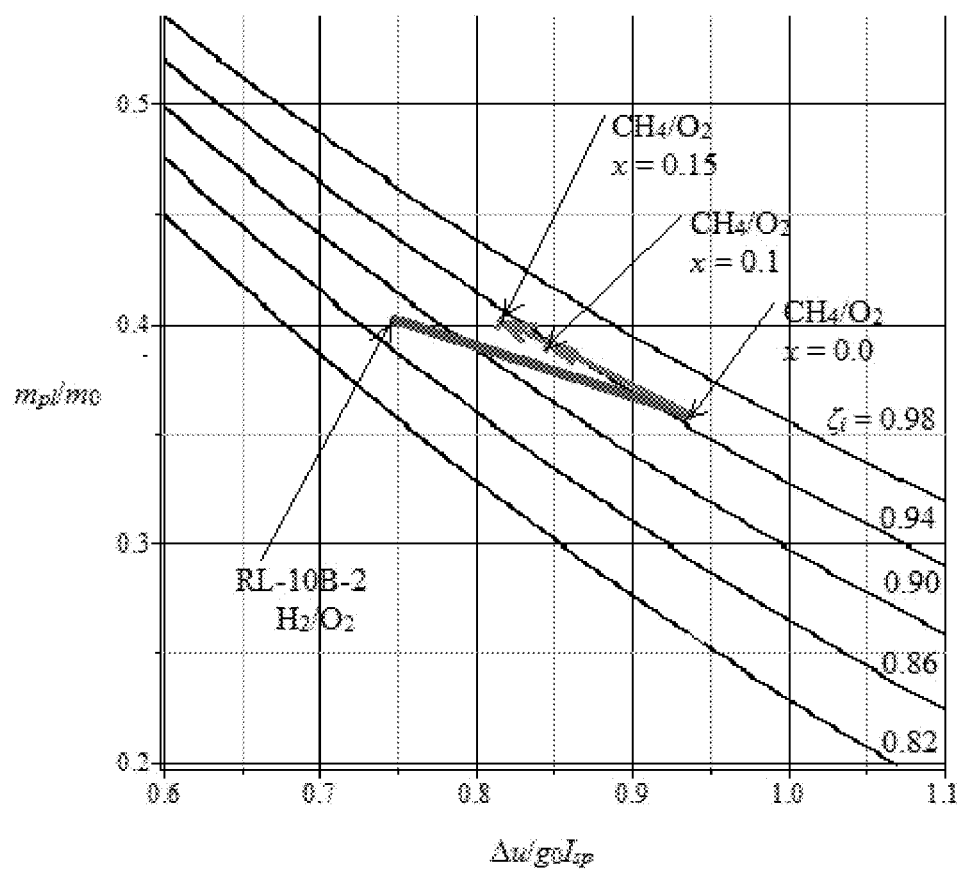
FIG. 5 illustrates a graph of payload mass-fraction ($m_{pl}/m_0$) as a function of $\Delta u/g_0 I_{sp}$ for relevant propellant mass-fractions, $\zeta_i$ defined in 0033.

Additionally, the use of hot helium infusion for specific impulse enhancement is expected to significantly reduce payload costs. FIG. 5 illustrates a graph of payload mass-fraction ($m_{pl}/m_0$) as a function of $\Delta u/g_0 I_{sp}$ for relevant propellant mass-fractions, $\zeta_i$ (less than 1.0 reflecting tankage masses, see Sutton, G. P. and Biblarz, O., "Rocket Propulsion Elements", $9^{th}$ Ed., Wiley (2017)). Using an existing $H_2/O_2$ comparable single upper stage vehicle with $\Delta u$=3,400 m/sec, the red line in FIG. 5 demonstrates an estimated ($\zeta_i$, $I_{sp}$)-change from (0.88, 465 sec) to (0.95, 377 sec) with the decrease of payload fraction, followed by anticipated increases of the $I_{sp}$ and $m_{pl}/m_0$ resulting from He-injection to ($\zeta_i$, $I_{sp}$)-values of (0.94, 410 sec) at x=0.1 and (0.93, 422 sec) at x=0.15 shown by the green line.

As shown in FIG. 5, any resulting higher propellant-mass fraction ($\zeta_i$) can only partially offset their lower maximum $I_{sp}$, because of a lower initial $T_1/M$. Also, using data from FIG. 4, the specific impulse of $CH_4/O_2$ can be enhanced with appropriately optimized hot helium gas mass injection amounts into upper-stage rocket engines to nearly match the payload mass fraction ($m_{pl}/m_0$) of the original $H_2/O_2$ fueled rocket. Additionally, because of the more robust helium storage required, propellant pumping with compressed helium gas in accordance with embodiments of the invention can be utilized with medium sized second or third stage rockets that now use turbopumps, such as the Russian RD-120 which delivered 85 kN vacuum thrust and the US's RL-10B-2 engine at 110 kN thrust (used as input data for FIG. 4).

As an example, in order to arrive at representative quantitative values, consider the second stage of a two-stage rocket that is required to propel a payload ($m_{pl}$) to $\Delta u$=3400 m/sec in a gravitationless, zero drag environment. The thrust and main hardware elements of the rocket engine are to be similar to the RL-10-B2 $H_2/O_2$ engine, but using liquid methane ($CH_4$) instead of liquid hydrogen and with all propellants pumped to steady flow by the compressed helium without any turbopumps. The example considered here keeps $m_0$, the total of the second stage mass plus payload, fixed which allows costs comparisons because this variable represents the payload for the first stage. All calculations reflect ideal behavior and quality of tankage design values (e.g., $\zeta_i$) are estimates based on data from Humble, R. W., Henry, G. N., and Larson. W. J., "Space Propulsion Analysis and Design", Appendix C, McGraw-Hill Space Technology Series, New York (1995). For the RL 10B-2, F=110 kN, $p_1$=4.36 MPa, $\epsilon$=385, and take $m_{pl}$=3500 kg at x=0.0. The $CH_4/O_2$ has a mixture ratio r=3.6 with inert gas pumping of propellants, before the hot-helium injection, $T_1$=3500 K and $I_{sp}$=377 sec (values of $I_{sp}$ for x>0 are from FIG. 4 and for $m_{pl}/m_0$ from FIG. 5). The total propellant mass ($m_p$) and the propulsion time $\Delta t$ are given by:

$$m_p = \frac{m_0 \zeta_i (1 - m_{pl}/m_0)}{(1+x)} \text{ and } \Delta t_p = \frac{m_p}{\dot{m}_p} = \frac{m_p(1+x)I_{sp}g_0}{F},$$

where $g_0$=9.81 m/sec$^2$.

Solving for $m_p$ and $\Delta t$ in constant flow rates, Table 1 below summarizes results for x=0.0, 0.1 and 0.15.

TABLE 1

Helium diluent mass ratio to estimated payload income.
Constant second-stage overall mass: $m_0 = m_{pl} + m_i = m_{pl} + m_p/\zeta_i$

| x | $m_0$ (kg) | $I_{sp}$ (sec) | $\zeta_i$ | $m_p$ (kg) | $m_{pl}$ (kg) | Mass & Volume He (kg, m$^3$)* | Propulsion Time (sec) | Est. Payload $ ** |
|---|---|---|---|---|---|---|---|---|
| 0.0 | 9536.3 | 377 | 0.95 | 5734 | 3500 | (NA) | 193 | 38.5M |
| 0.10 | 9536.3 | 411 | 0.94 | 4940 | 3755 | 494, 1.49 | 199 | 41.3M |
| 0.15 | 9536.3 | 422 | 0.93 | 4646 | 3791 | 697, 2.10 | 201 | 41.7M |

In Table 1, a single asterisk (*) represents helium gaseous storage at 100 K and 69 MPa (perfect gas behavior), a pressure higher than the chamber operating pressure, minimum values are given not accounting for helium uses other than injection. Two asterisks (**) represent estimated income at $5,000/lbm of payload to LEO for entire vehicle (lowest present value)–494 kg for liquid helium (presently at $40/kg to $120/kg) would cost from $20,000 to $60,000 at x=0.1 (less than 0.1% of payload gain).

Noticeable costs of using helium do arise from both added hardware and from the helium propellant itself. Being scarce on Earth, currently liquid helium costs about 30 times more than liquid oxygen, in 2017 fluctuating between $5 and $15/liter, but methane is relatively inexpensive. All these costs are expected to be more than compensated for by enhancements of the rocket's payload capabilities and by potential hardware and starting simplifications (i.e., no turbopumps) utilizing embodiments in accordance with the invention.

While helium-3 would be more attractive, it is extremely rare on Earth's surface and in 2016 large deposits of helium-4 were found in Tanzania. Helium-4 is a liquid at 4 K and one atmosphere, colder than liquid hydrogen, but somewhat denser at 125 kg/m$^3$, and all the many precautions needed for liquid hydrogen usage apply to liquid helium. However, stored in the rocket vehicle as a compressed gas at about 100 K, near the liquid temperature of the liquid oxygen and $CH_4$ propellants, and 69 MPa, it has a density of about 332 kg/m$^3$ which could make any helium-tank volumes smaller than those for oxygen.

With liquid helium storage, turbopumps would be necessary; however, gaseous high-pressure storage would permit propellant pumping without turbopumps. Helium high-pressure tanks have needed to be thick walled and massive but newer designs using aluminum liners with outer layers of strong carbon fibers or other modern composite arrangements can be lighter and thus more attractive. Also, non-spherical tanks would package better into rocket vehicles. Noticeable enhancements of the propellant mass fraction ($\zeta_i$) over turbopumped systems should be expected with embodiments in accordance with the invention.

While all helium uses described herein could also work with other hydrocarbon fuels, methane is currently considered to be a practical propellant and more ecologically friendly than RP-1 fuel. However, any unburned methane exhausted to the atmosphere captures more infrared solar radiation than $CO_2$ and although short lived is not desirable. At the mixture ratios envisioned herein, there is little or no methane in the exhaust gases, but as with other hydrocarbon fuels, including $CO_2$, some noticeable amounts of CO may be generated.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A rocket engine having specific impulse enhancement by hot helium infusion comprising:
   a pressurized liquid methane propellant connected to at least a first injection port of a combustion chamber of the rocket engine;
   the first injection port configured to allow injection of the liquid methane propellant into the combustion chamber;
   a pressurized liquid oxygen propellant connected to at least a second injection port of the combustion chamber;
   the second injection port configured to allow injection of the liquid oxygen propellant into the combustion chamber;
   a pressurized helium gas connected to a heat exchanger system surrounding the combustion chamber and a nozzle of the rocket engine;
   the heat exchanger system connected to a helium infusion control valve, the heat exchanger system configured to heat the helium gas as it flows through the heat exchanger system;
   the helium infusion control valve connected to at least a third injection port of the combustion chamber, the helium infusion control valve configured to control the flow of the heated helium gas to the third injection port; and,
   the third injection port configured to allow injection of the heated helium gas into the combustion chamber;
   wherein, in operation of the rocket engine, the liquid methane propellant and the liquid oxygen propellant are injected into the combustion chamber, and the helium gas is heated in the heat exchanger system prior to injection into the combustion chamber such that upon injection of the heated helium gas into the combustion chamber with the liquid methane propellant and the liquid oxygen propellant, the specific impulse of the rocket engine is enhanced.

2. The rocket engine of claim 1, wherein the pressurized helium gas is further connected via a helium control valve to a liquid methane storage tank containing the liquid methane propellant, and to a liquid oxygen storage tank containing the liquid oxygen propellant, and the helium gas is used to pressurize the liquid methane propellant and the liquid oxygen propellant.

3. The rocket engine of claim 2, wherein the liquid methane propellant, the liquid oxygen propellant and the heated helium gas are injected at a back plate of the combustion chamber.

4. The rocket engine of claim 3, further wherein the liquid methane propellant, the liquid oxygen propellant and the heated helium gas are injected substantially at a centerline of the combustion chamber.

5. The rocket engine of claim 1, wherein the liquid methane propellant, the liquid oxygen propellant, and the heated helium gas are injected at a back plate of the combustion chamber.

6. The rocket engine of claim 5, further wherein the liquid methane propellant, the liquid oxygen propellant, and the heated helium gas are injected substantially at a centerline of the combustion chamber.

7. The rocket engine of claim 1, wherein the heat exchanger system further comprises one or more cooling conduits configured to cool the combustion chamber and nozzle as the helium gas passes through the heat exchanger system during rocket operation.

8. The rocket engine of claim 1, wherein the rocket engine is communicatively coupled to control systems that control the flows of the helium gas, the liquid methane propellant, and the liquid oxygen to regulate the thrust levels of the rocket engine.

9. The rocket engine of claim 1, wherein the pressurized helium gas connected to the heat exchanger system surrounding the combustion chamber and the nozzle of the rocket engine further comprises:
   the pressurized helium gas connected to a specific impulse control valve;
   the specific impulse control valve connected to a helium injection and relief valve; and the helium injection and relief valve connected to the heat exchanger system.

10. A method for specific impulse enhancement by hot helium infusion of a rocket engine having a pressurized helium gas stored in a helium storage tank, a liquid methane propellant stored in a liquid methane storage tank, and a liquid oxygen propellant stored in a liquid oxygen storage tank, the method comprising:
- opening a helium control valve to allow the pressurized helium gas to pressurize and pump the liquid methane propellant from the liquid methane storage tank and the liquid oxygen propellant from the liquid oxygen storage tank to a combustion chamber of the rocket engine, and to allow the pressurized helium gas to flow to a closed specific impulse control valve;
- activating one or more rocket control systems that control thrust of the rocket engine;
- controlling the injection of the liquid methane propellant through at least a first injection port into the combustion chamber;
- controlling the injection of the liquid oxygen propellant through at least a second injection port into the combustion chamber;
- igniting the injected liquid methane propellant and the liquid oxygen propellant in the combustion chamber;
- upon a determination that combustion has started in the combustion chamber and is self-sustaining, opening the specific impulse control valve and regulating the flow of the pressurized helium gas into one or more cooling conduits of a heat exchanger system surrounding the combustion chamber and a nozzle of the rocket engine to heat the helium gas and produce a hot helium gas;
- controlling the flow of the hot helium gas from the heat exchanger system to at least a third injection port to the combustion chamber by a helium infusion control valve;
- injecting the hot helium gas through the third injection port into the combustion chamber with the injected liquid methane propellant and the injected liquid oxygen propellant; and
- regulating the flow of the hot helium gas into the combustion chamber until a desired diluent mass ratio is achieved to enhance the specific impulse of the rocket engine.

11. The method of claim 10 wherein the liquid methane propellant, the liquid oxygen propellant, and the heated helium gas are injected at a back plate of the combustion chamber.

12. The method of claim 11, further wherein the liquid methane propellant, the liquid oxygen propellant and the heated helium gas are injected substantially at a centerline of the combustion chamber.

13. The method of claim 10 wherein the liquid methane propellant and the liquid oxygen propellant are cryogenically stored, and further wherein the pressurized helium gas is stored at temperatures near those of the liquid methane propellant and the liquid oxygen propellant.

14. The method of claim 10 wherein the flow of helium gas through the heat exchanger system cools the combustion chamber and nozzle during rocket operation.

* * * * *